United States Patent [19]

Traspadini

[11] Patent Number: 5,137,072
[45] Date of Patent: Aug. 11, 1992

[54] SUN CURTAIN ASSEMBLY FOR INDUSTRIAL VEHICLE AND BUILDING WINDOWS

[76] Inventor: Gianluigi Traspadini, Via Streccia, 34, 21040 Venegono Superiore (Varese), Italy

[21] Appl. No.: 591,614

[22] Filed: Oct. 2, 1990

[30] Foreign Application Priority Data

Oct. 18, 1989 [IT] Italy ............................. 22050 A/89

[51] Int. Cl.⁵ ............................. E06B 9/56; B60J 1/20
[52] U.S. Cl. ................................... 160/26; 160/324; 160/370.2; 296/97.8; 296/97.9
[58] Field of Search ................. 160/19, 23.1, 26, 324, 160/370.2, 271, DIG. 2, DIG. 3; 296/97.8, 97.9, 141

[56] References Cited

U.S. PATENT DOCUMENTS

| | | | |
|---|---|---|---|
| 580,697 | 4/1897 | Kraemer | 160/23.1 X |
| 1,448,016 | 3/1923 | Welshausen | 160/370.2 X |
| 2,594,813 | 4/1952 | Seibert | 296/97.8 X |
| 3,126,049 | 3/1964 | Hollands | 160/271 X |

FOREIGN PATENT DOCUMENTS 3001919 7/1981 Fed. Rep. of Germany ........ 160/19

Primary Examiner—Carl D. Friedman
Assistant Examiner—Derek J. Berger
Attorney, Agent, or Firm—Bucknam and Archer

[57] ABSTRACT

A sun curtain assembly comprises an extruded material casing which is provided with opposite legs including end coupling grooved portions defining a slot therethrough the curtain sheet material can pass, the casing legs being adapted to be resiliently deformed for facilitating the coupling to the edges of the slot, side supporting elements being supported at the ends of the casing to allow the latter to be easily deformed.

5 Claims, 7 Drawing Sheets

SUN CURTAIN ASSEMBLY FOR INDUSTRIAL VEHICLE AND BUILDING WINDOWS

BACKGROUND OF THE INVENTION

The present invention relates to a sun certain assembly for industrial vehicle and building windows and the like.

As is known, sun curtains are broadly used on motor vehicle mainly due to the fact that modern motor vehicles comprise slanted rear glass surfaces, and these curtains being specifically designed from protecting against the sun rays the rear seat passengers of the vehicle.

These sun curtains, in particular, can be applied also in the compartments of industrial vehicles, such as autobus and the like, at the top portion of the windshield thereof, in order to protect the driver against the sun rays, while providing good visibility characteristics.

Likewise, these curtains can also be used at the top portions of the side windows of the vehicle.

According to a conventional construction, these sun curtains usually comprise a curtain sheet winding roller, provided with a curtain return spring, as well as with side supporting elements for pivotably supporting the curtain winding roller, and an outer casing therefrom a curtain gripping lug projects.

In order to hold the space occupied by the curtain winding roller as small as possible, above the roller mounting surface there are at present provided slots therethrough the curtain sheet material can be withdrawn: these slots, on the other hand, weaken the region underlying the rear window and the usually provided horizontal supporting panel at the bottom of the rear window, which is susceptible to be easily deformed by heavy articles resting thereon.

As this panel is deformed, the curtain sheet unwinding and winding operation are hindered.

To the foregoing it is to be added that known sun curtain assemblies require very complex and time consuming assembling operations.

Yet another drawback is that the slot therethrough the curtain sheet is withdrawn can be easily obstructed by small size articles, such as coins, metal staples and the like, which can also damage the curtain sheet material.

SUMMARY OF THE INVENTION

Accordingly, the main object of the present invention is to overcome the above mentioned drawbacks, by providing a new sun curtain assembly which can be constructed and installed in a very simple way and which is moreover specifically designed for stiffening the rear window underlying panel.

Another object of the present invention is to provide such a sun curtain assembly which provides a nearly tight closure between the luggage space and the passenger compartment, so as to prevent noise and bad odors from penetrating this compartment.

Another object of the present invention is to provide such a sun curtain which comprise a very reduced number of easily and quickly assemblable elements and which, moreover, is very competitive from a more economic standpoint.

According to one aspect of the present invention, the above mentioned objects, as well as yet other objects, which will become more apparent hereinafter, are achieved by a sun curtain assembly for industrial vehicle rear and side windows, characterized in that said sun curtain assembly comprises an extruded material casing having two opposite legs including edge coupling grooves defining a slot therethrough a curtain sheet can pass, said slot being adapted to operate as a stiffening element for a panel member, said legs of said casing being resiliently deformable for coupling said grooves to said edges, said casing including end portions where there are provided side supporting elements which are adapted to allow said casing to be deformed to be assembled in said slot.

BRIEF DESCRIPTION OF THE DRAWINGS

Further characteristics and advantages of the present invention will become more apparent from the following detailed description of some preferred, though not exclusive, embodiments thereof which are illustrated, by way of indicative but not limitative example, in the figures of the accompanying drawings, where.

DESCRIPTION OF THE PREFERRED EMBODIMENTS

Figure 1:
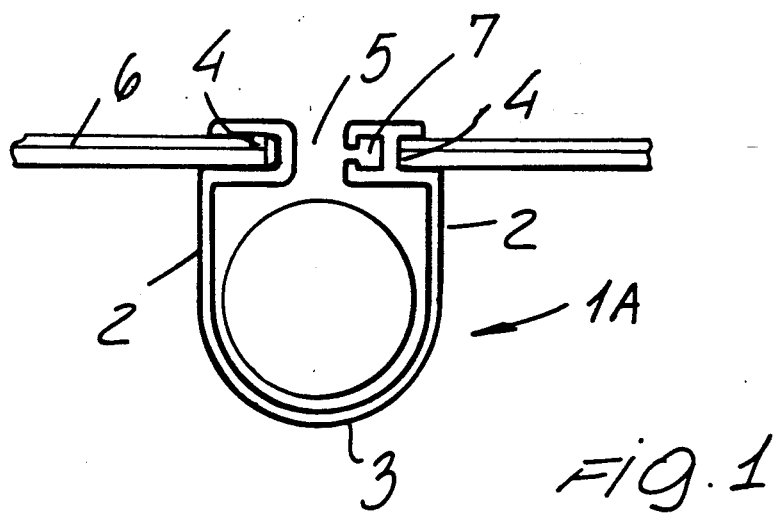
FIGS. 1 to 3 are schematic cross-sectional views illustrating some possible embodiments of the extruded material casing included in the sun curtain according to the invention.

With reference to the figures of the accompanying drawings, the sun curtain assembly for industrial vehicle rear and side windows according to the present invention comprises an extruded material casing, which has been indicated at the reference number 1 and provided for holding therein a curtain roll 5' which has been shown only in FIG. 1.

Figure 2:
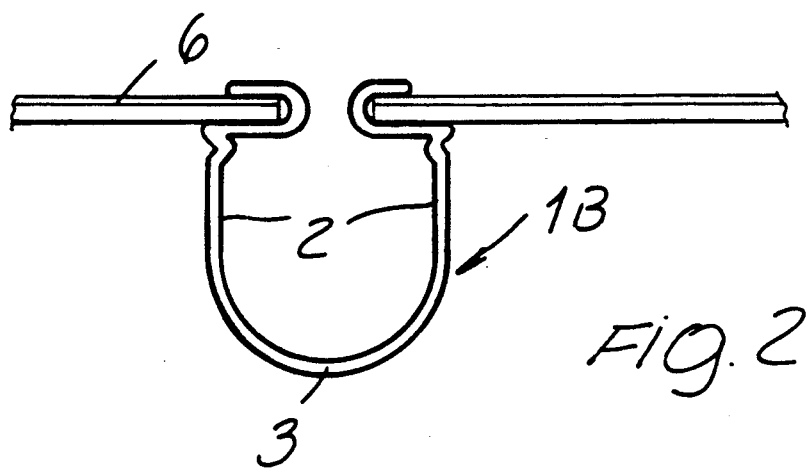
Figure 3:
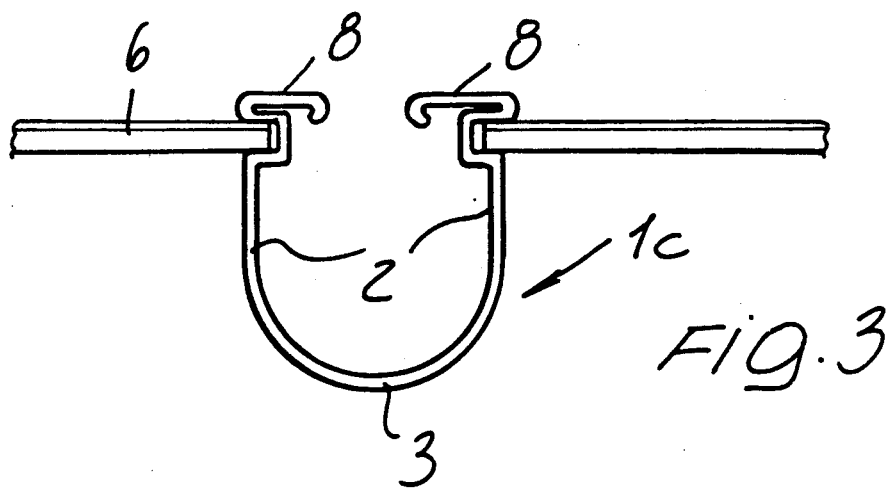

This casing, as shown in FIGS. 1 to 3, can have different shapes which are indicated at 1A, 1B, and 1C.

More specifically, in the embodiment 1A shown in FIG. 1, the casing of substantially U-shape, is provided with a pair of casing opposite legs 2, coupled by a bottom central portion 3; the legs being provided with top grooves 4 which engage with the edges of the slot 5, formed through the horizontal plate-like panel 6 thereon said casing must be applied. In this connection it should be apparent from the drawings that the casing will be applied to that surface (the bottom surface in the figures) of the panel 6 which is opposite to the curtain withdrawing side (the top side in the drawings) of said panel 6.

According to the embodiment 1A, there is provided a seat adapted to receive therein a slot closure gasket, as it will be disclosed in a more detailed way hereinafter.

The embodiment 1B is conceptually analogous to the embodiment 1A, the gasket being however omitted.

The embodiment 1C comprises, on the top of the region having the grooves 4, inward bent portions 8.

Figure 4:
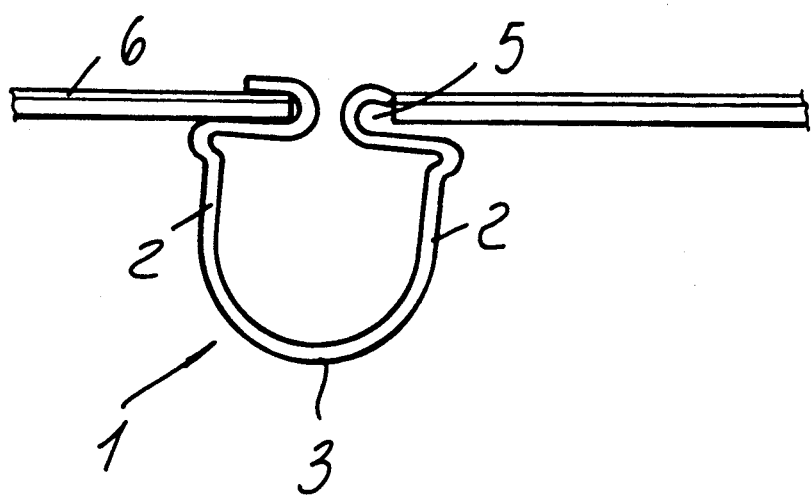
FIG. 4 shows a possible procedure for introducing the casing into a slot provided through a panel element.
Figure 5:
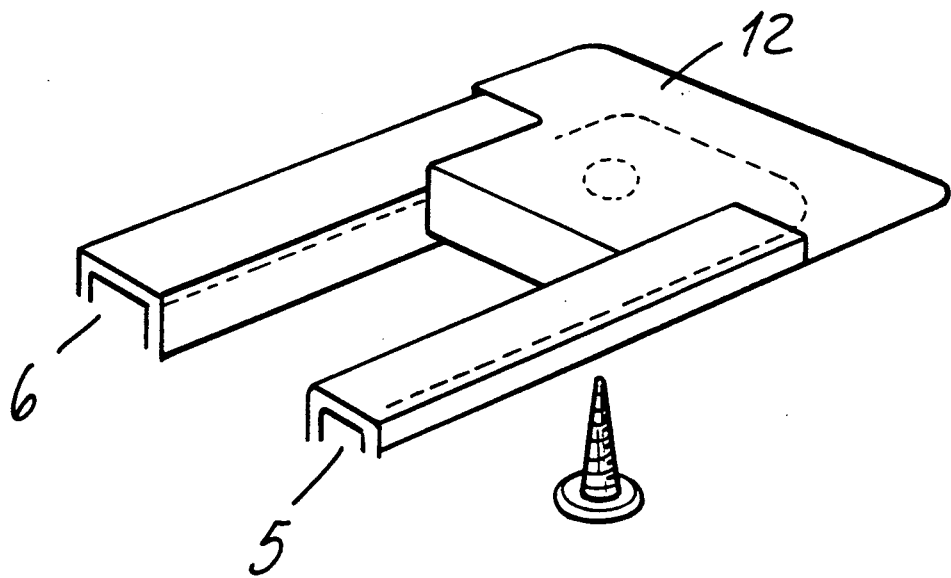
FIG. 5 is a perspective view of a plate like element applied at the top of a side supporting element.

According to the invention, the casing legs 2 can be resiliently deformed, so as to allow the casing, as shown in FIG. 4, to be mounted riding on the panel edges defining the slot 5.

In this embodiment, accordingly, the top portion of the extruded casing, which can be suitably painted or anodized, will provide also a good finishing frame.

Another main aspect of the present invention is that the extruded casing is adapted to provide a panel stiffening element or beam, extending in the cross direction of the vehicle, which can resist against stresses induced by temperature variations and the like.

Moreover this casing can be assembled in a very simple and quick way, since it will be sufficient to resiliently deform the casing legs in order to introduce the casing through the mentioned slot.

Figure 6:
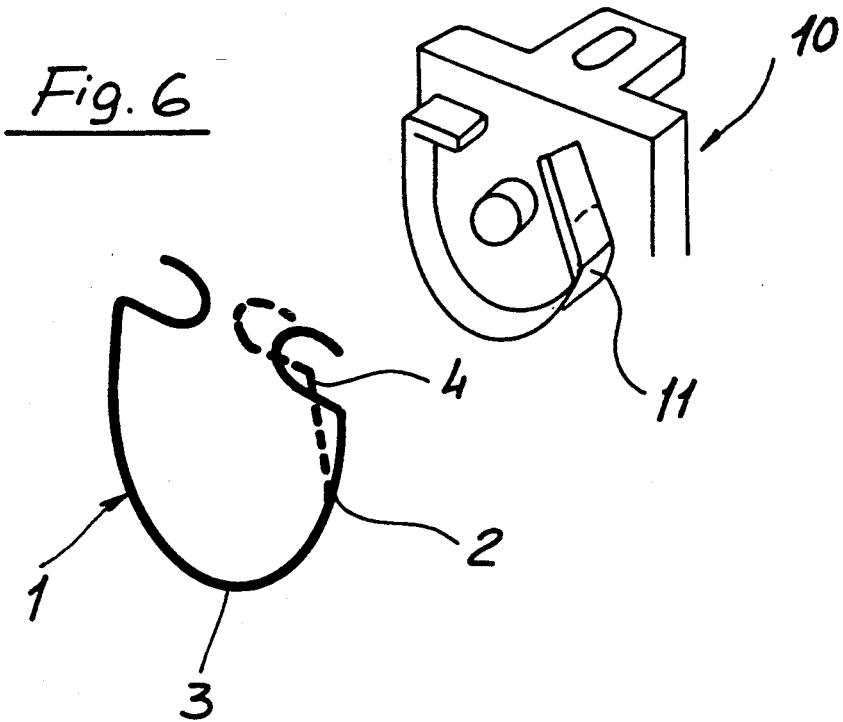
FIG. 6 is a detail view of the side supporting element and specifically shows, by a dashed line, the position assumed by the casing during the introduction operation thereof.
Figure 7:
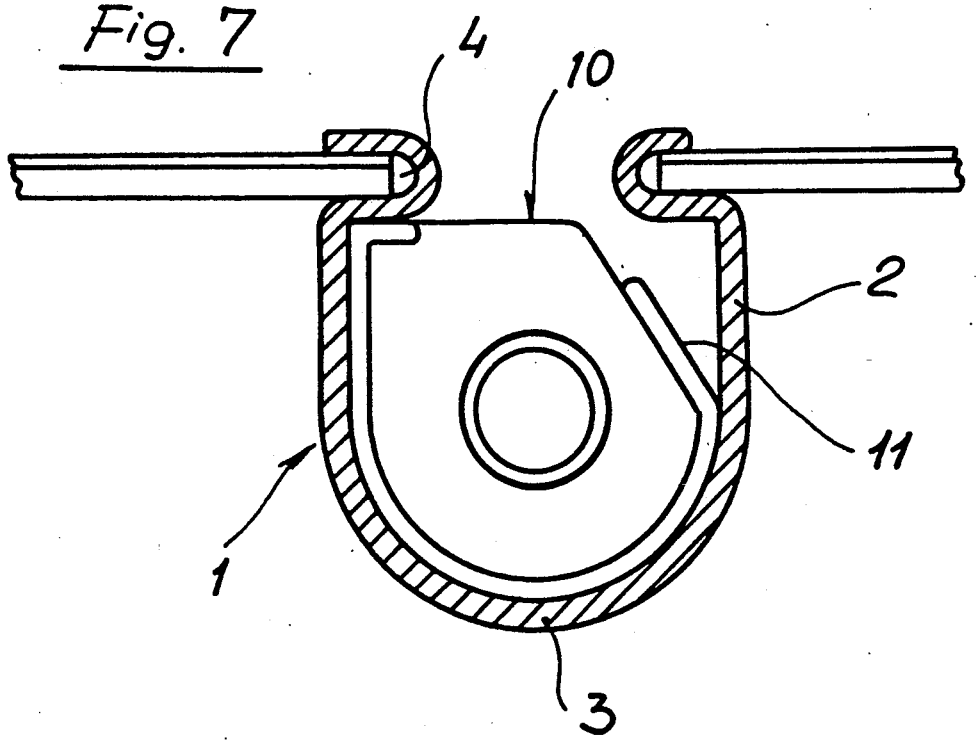
FIG. 7 is a cross-sectional view showing the casing and related side supporting element, which is designed to allow the casing leg to be resiliently deformed.

The casing body is moreover provided, at the end portions thereof, with side supporting elements, which are overally indicated at the reference number 10, which will have a shape substantially mating that of the several extruded profiles, with an additional recess 11 for facilitating the assembling of the casing, by deforming the resilient legs thereof, as it is clearly shown in FIGS. 6 and 7.

Figure 8:
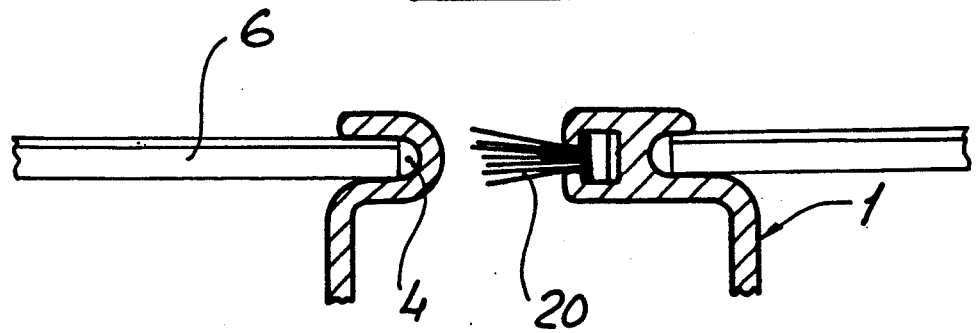
FIGS. 8 to 10 are further cross-sectional view illustrating possible embodiments of the gaskets provided for tightly closing a top slot.
Figure 9:
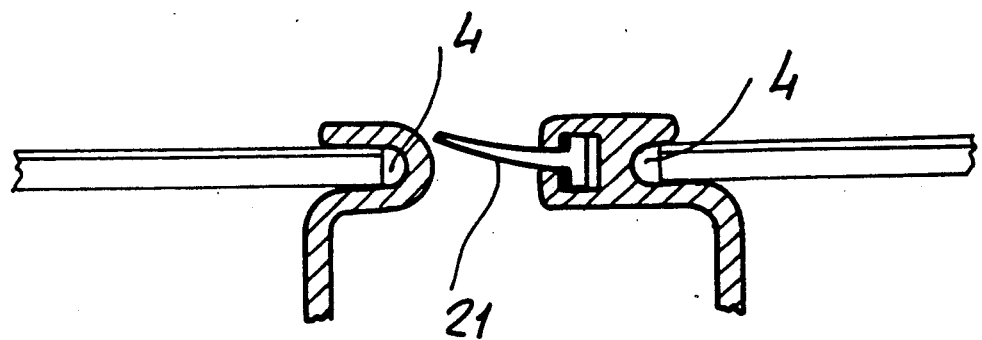
Figure 10:
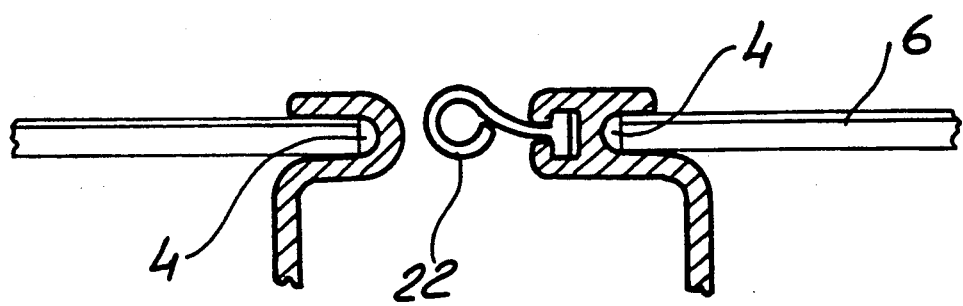

As stated, it is further possible to provide a sealing gasket for the slot therethrough the curtain sheet element is entrained; this closure element, in particular, can comprise either a bristle seal 20, which is shown in FIG. 8, or an annular sealing element 22, as shown in FIG. 10.

This sealing element will close tightly said slot, while allowing the curtain sheet element to be easily withdrawn and rewound.

Figure 11:
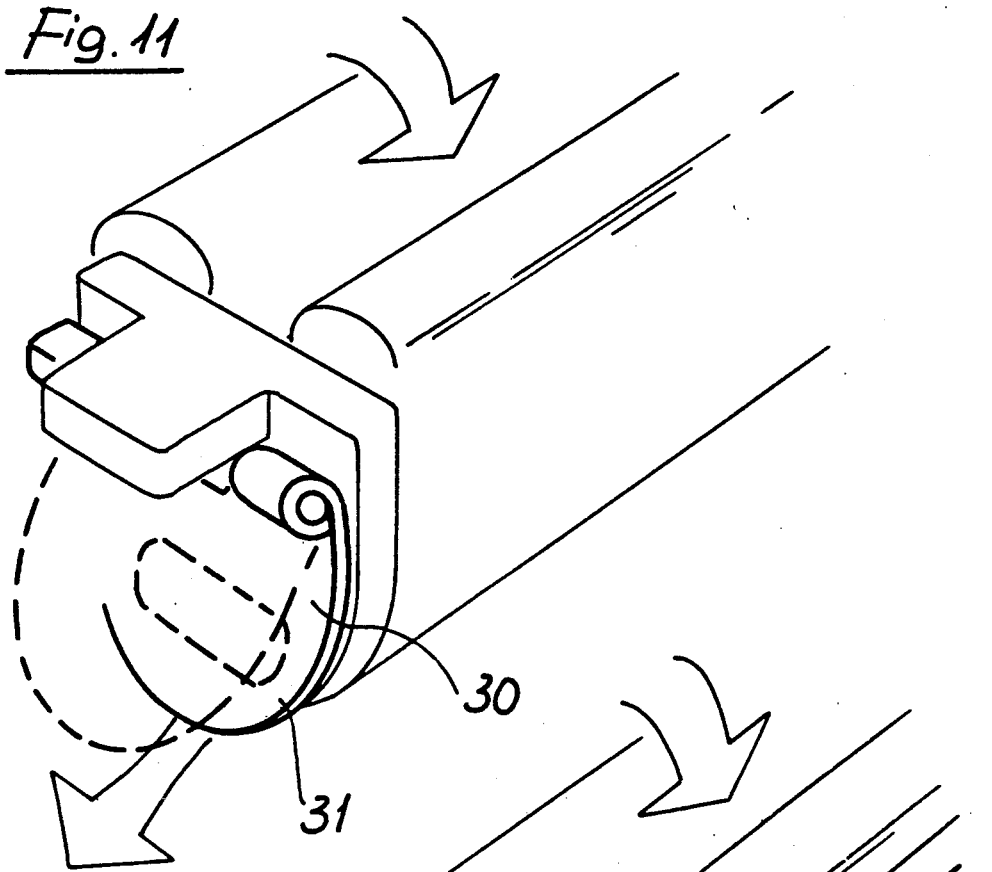
FIGS. 11 and 12 show two possible embodiment of an air bleed assembly.
Figure 12:
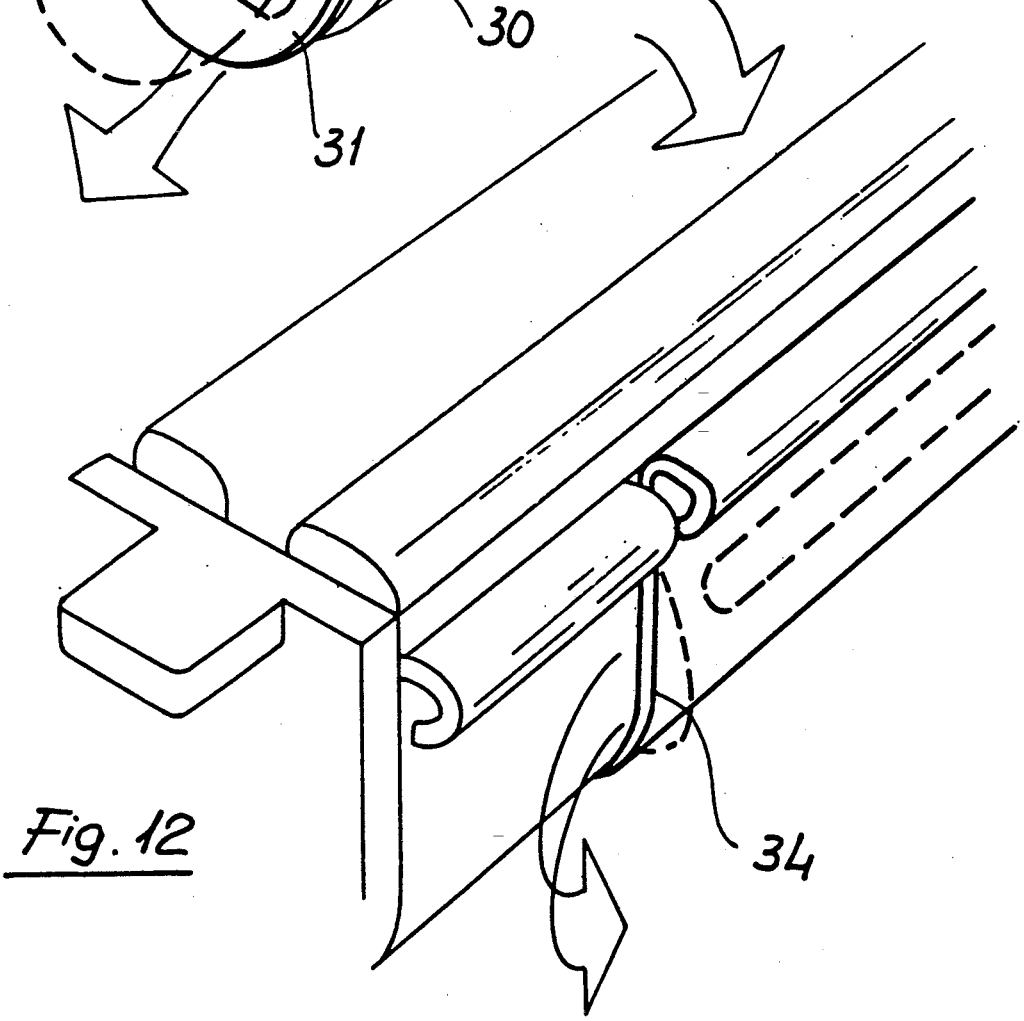

Another function provided by the sun curtain assembly according to the present invention is an air bleeding function, as shown in FIGS. 11 and 12.

In this connection it should be pointed out that the rear window underlying panels are frequently formed with cut outs, for example at the zones thereof where there are clamped or glued net and the like, in order to allow the cab air to be quickly ejected as a door is closed, with the windows in a closed condition.

The shown embodiment allow this air to be easily ejected, without requiring a communication between the luggage and cab.

In particular, as shown in FIG. 11, a cut out 30 formed through the side supporting element, closed by a tilting fin 31 which practically operates as a directional valve.

A like embodiment is shown in FIG. 12, in which the air bleed slot, indicated at the reference number 34, is made on the side body.

Figure 13:
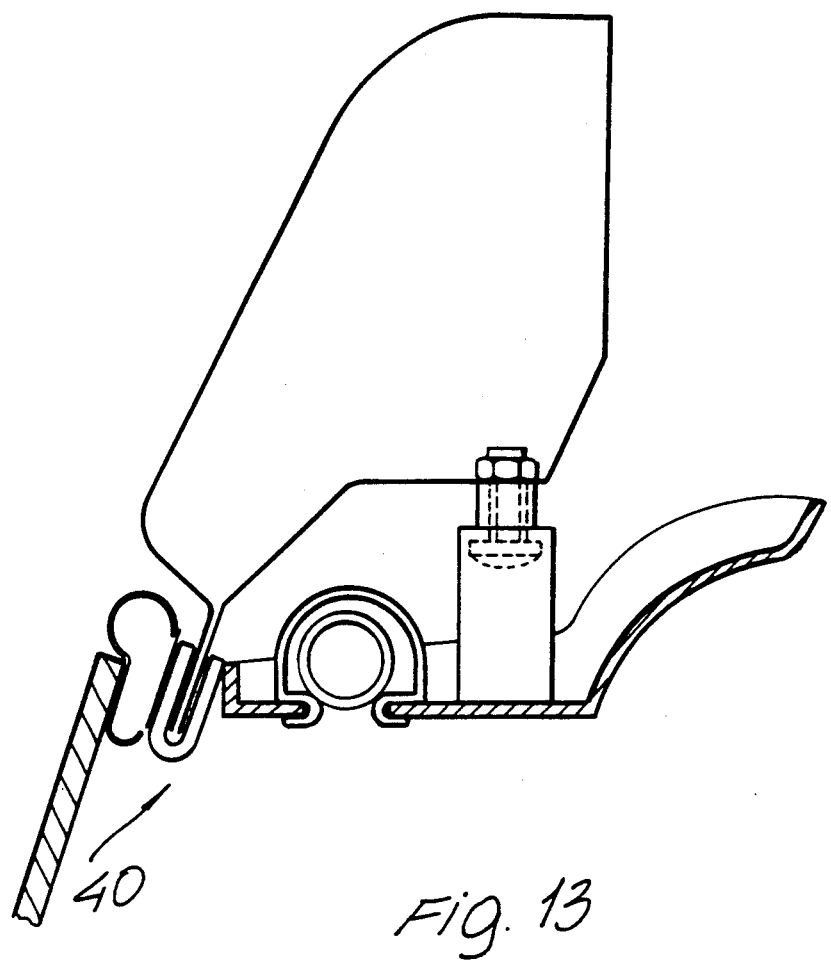
FIG. 13 shows the casing applied to the cab of a tractor.
Figure 14:
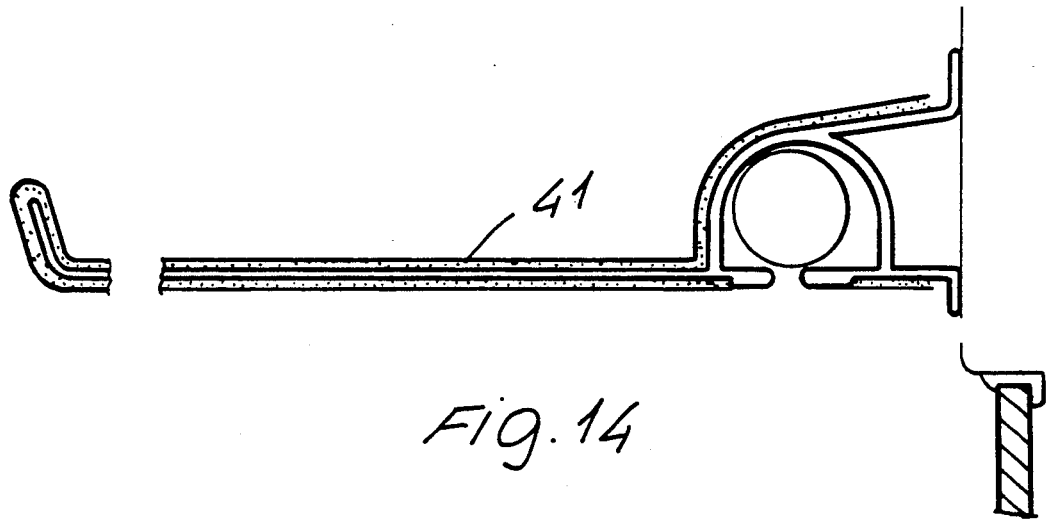
FIG. 14 shows the casing applied to a bus shelf element.

As shown in FIG. 13, the casing according to the present invention can also be applied in the cab of a tractor, indicated at 40, or, if desired, on the luggage supporting shelf 41 of a bus, with a possible application on all of the side windows.

Figure 15:
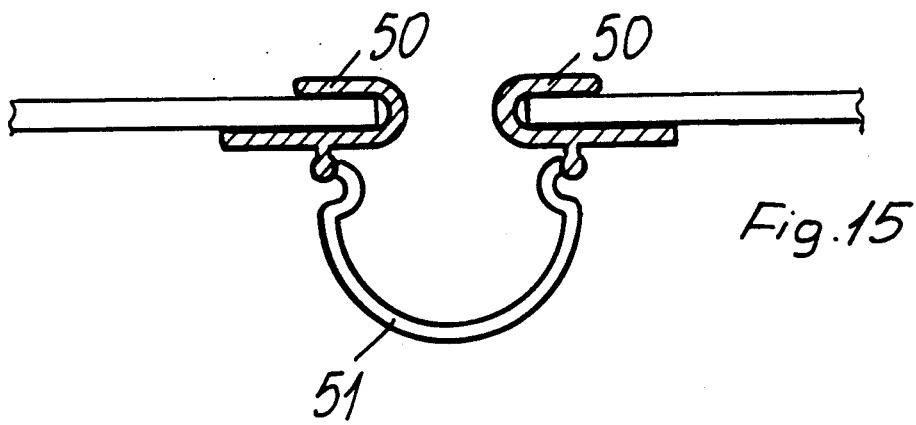
FIGS. 15 to 17 show possible embodiments of the extruded material casing.
Figure 16:
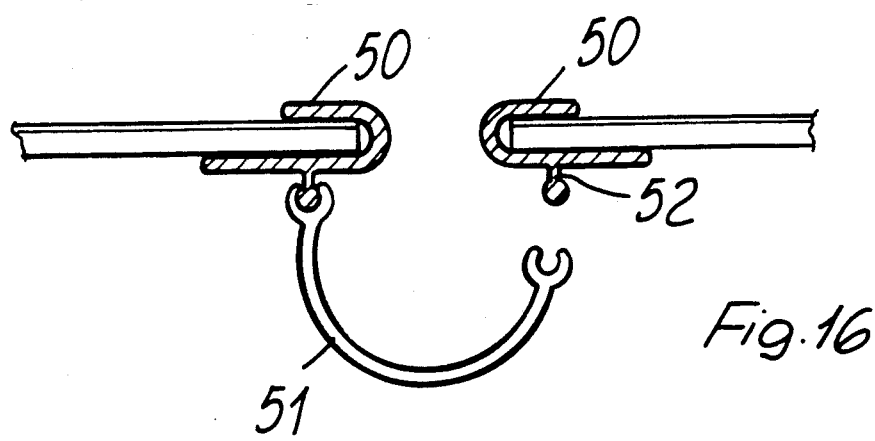
Figure 17:
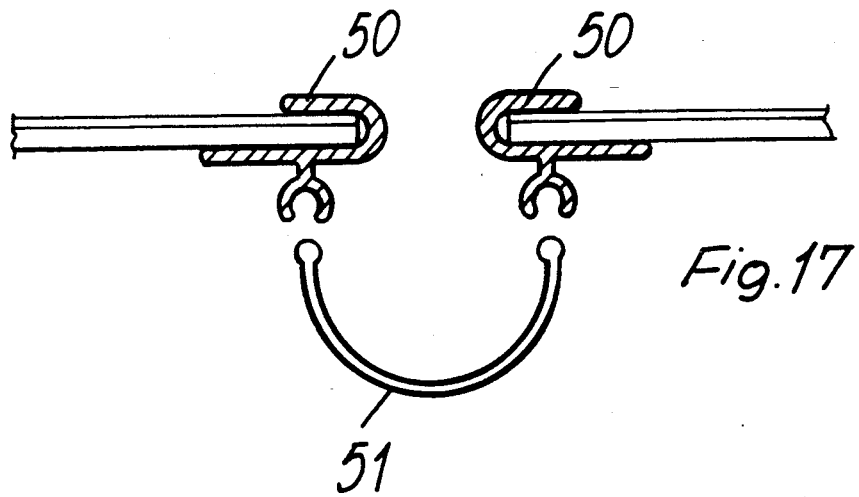

As shown in FIGS. 15, 16 and 17 there are provided variations in which the casing, instead of including a single extruded, material element, is provided with two casing opposite top rim portions, indicated at 50 and of substantially U-shape, which can be applied to the edges of the panel slot, and to which a casing bottom body 51 can be applied by pressure, to make said bottom body 51 rigid with the opposite portions 50.

To perform this coupling, and as is shown in FIG. 16, lugs 52 can be formed integral with the U-shape rim portions 50, said lugs 52 downwardly projecting as the rim portions 50 are engaged with the edges of the slot 5. The lugs 52 are provided for engaging in recesses 52' formed as shown at edge top portions of the casing bottom body 51.

In FIG. 17 the disclosed coupling arrangement has been reversed, with the lugs 52" formed on the bottom body and the recesses 52"' formed in the rim portions 50. This embodiment is conceptually analogous to the above disclosed embodiment, with the single difference that it comprises three portions, preferably made of extruded aluminium elements which are mutually coupled at the installation time.

From the above disclosure it should be apparent that the invention fully achieves the intended objects.

While the invention has been disclosed and illustrated with reference to a preferred embodiment thereof, it should be apparent that the disclosed embodiment is susceptible to several modifications and variations all of which will come within the spirit and scope of the appended claims.

I claim:

1. A sun curtain assembly comprising a vehicle rear window and a panel having a panel slot with opposite slot edges, said panel being fitted to a bottom portion of said rear window, said assembly further comprising an extruded casing having a resiliently deformable bottom body for housing a sun curtain therein and two casing opposite top rim portions, each said rim portion having a substantially U-shaped groove removably receiving said opposite edges of said slot to removably couple said rim portions and said bottom body to said panel and stiffen said panel.

2. A sun curtain assembly according to claim 1, wherein said resiliently deformable bottom body and said rim portions are extruded as a single piece, said bottom body of said casing being substantially U-shaped with two substantially vertical legs.

3. A sun curtain assembly according to claim 1, wherein said casing bottom body has an arch shape, said body and said two opposite rim portions of said casing comprising three separate casing pieces, and wherein first pressure coupling means are provided on said rim portions and second pressure coupling means are provided on said casing bottom body respectively for rigidly coupling said rim portions and casing bottom body, upon pressure engaging said first and second pressure coupling means.

4. A sun curtain assembly according to claim 3, wherein said first pressure coupling means comprise lug means rigid with said rim portions and downward extending therefrom, and said second pressure coupling means comprise recess means formed in said casing bottom body.

5. A sun curtain assembly according to claim 3, wherein said first pressure coupling means comprise recess means formed in said rim portions, while said second pressure coupling means comprise lug means rigid with said casing bottom body.

* * * * *